(12) United States Patent
Amin-Shahidi et al.

(10) Patent No.: US 10,281,984 B1
(45) Date of Patent: May 7, 2019

(54) HAPTIC ACTUATOR INCLUDING SIDEWALL CLEARANCE RESTRICTING FEATURE AND RELATED METHODS

(71) Applicant: Apple Inc., Cupertino, CA (US)

(72) Inventors: Darya Amin-Shahidi, San Jose, CA (US); Scott D. Abrahamson, Longmont, CO (US); Pongpinit Towashiraporn, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/964,189

(22) Filed: Apr. 27, 2018

(51) Int. Cl.
*G06F 3/01* (2006.01)

(52) U.S. Cl.
CPC .................. *G06F 3/016* (2013.01)

(58) Field of Classification Search
CPC ........................................ G06F 3/016
See application file for complete search history.

(56) References Cited

U.S. PATENT DOCUMENTS

| | | | | |
|---|---|---|---|---|
| 8,169,402 | B2 | 5/2012 | Shahoian et al. | |
| 10,033,259 | B2 * | 7/2018 | Wang | H02K 33/16 |
| 10,156,649 | B2 * | 12/2018 | Nieman | G01V 1/162 |
| 2004/0169425 | A1 * | 9/2004 | Aihara | B06B 1/045 |
| | | | | 310/15 |
| 2010/0213773 | A1 * | 8/2010 | Dong | H02K 33/16 |
| | | | | 310/25 |
| 2011/0156500 | A1 * | 6/2011 | Dong | H02K 33/16 |
| | | | | 310/25 |
| 2011/0266892 | A1 * | 11/2011 | Wauke | B06B 1/045 |
| | | | | 310/25 |
| 2012/0049660 | A1 * | 3/2012 | Park | B06B 1/045 |
| | | | | 310/25 |
| 2012/0169151 | A1 * | 7/2012 | Dong | H02K 33/16 |
| | | | | 310/25 |
| 2014/0197936 | A1 | 7/2014 | Biggs et al. | |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Nay Tun
(74) *Attorney, Agent, or Firm* — Allen, Dyer, Doppelt & Gilchrist, P.A.

(57) ABSTRACT

A haptic actuator may include a housing having opposing ends and opposing sides extending therebetween. The haptic actuator may also include at least one coil carried by the housing and a field member having opposing ends and opposing sides extending therebetween. The haptic actuator may also include a respective flexure coupling each end of the field member to an adjacent end of the housing so that the field member is reciprocally movable within the housing responsive to the at least one coil over an operating range and while maintaining a respective sidewall clearance between each side of the field member and an adjacent side of the housing. At least one sidewall clearance restricting feature may be configured to restrict the sidewall clearance when the field member moves beyond the operating range when subject to mechanical shock.

23 Claims, 9 Drawing Sheets

(56) References Cited

U.S. PATENT DOCUMENTS

| | | |
|---|---|---|
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2017/0033655 A1* | 2/2017 | Wang .................. H02K 33/16 |
| 2017/0033661 A1* | 2/2017 | Wang .................. H02K 33/16 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

US 10,281,984 B1

HAPTIC ACTUATOR INCLUDING SIDEWALL CLEARANCE RESTRICTING FEATURE AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing having opposing ends and opposing sides extending therebetween. The haptic actuator may also include at least one coil carried by the housing and a field member having opposing ends and opposing sides extending therebetween. The haptic actuator may also include a respective flexure coupling each end of the field member to an adjacent end of the housing so that the field member is reciprocally movable within the housing responsive to the at least one coil over an operating range and while maintaining a respective sidewall clearance between each side of the field member and an adjacent side of the housing. At least one sidewall clearance restricting feature may be configured to restrict the sidewall clearance when the field member moves beyond the operating range when subject to mechanical shock.

The at least one sidewall clearance restricting feature may include at least one protruding body carried by the housing and extending within the respective sidewall clearance. The field member may have a recess therein adjacent the at least one protruding body, for example.

The housing may include metal, for example. The at least one protruding body may include an at least one stamped metal protruding body.

The at least one sidewall clearance restricting feature may include at least one protruding body carried by the field member and extending within the respective sidewall clearance, for example. The housing may have a recess therein adjacent the at least one protruding body.

Each respective flexure may have a wishbone shape and include two diverging arms joined together at proximal ends and having spaced distal ends operatively coupled between adjacent ends of the field member and the housing, for example. Each respective flexure may have a bend therein joining together the two diverging arms at the proximal ends.

The haptic actuator may include a respective at least one anchor member coupled to an adjacent end of the housing and spaced from an adjacent end of the field member, for example. Each respective flexure may be coupled between the respective at least one anchor member and the field member, for example. The field member may include at least one permanent magnet adjacent the at least one coil.

A method aspect is directed to a method of making a haptic actuator that includes a housing having opposing ends and opposing sides extending therebetween, at least one coil carried by the housing, and a field member having opposing ends and opposing sides extending therebetween. The method may include positioning a respective flexure coupling each end of the field member and an adjacent end of the housing so that the field member is reciprocally movable within the housing responsive to the at least one coil over an operating range and while maintaining a respective sidewall clearance between each side of the field member and an adjacent side of the housing. The method may also include forming at least one sidewall clearance restricting feature to restrict the sidewall clearance when the field member moves beyond the operating range when subject to mechanical shock.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
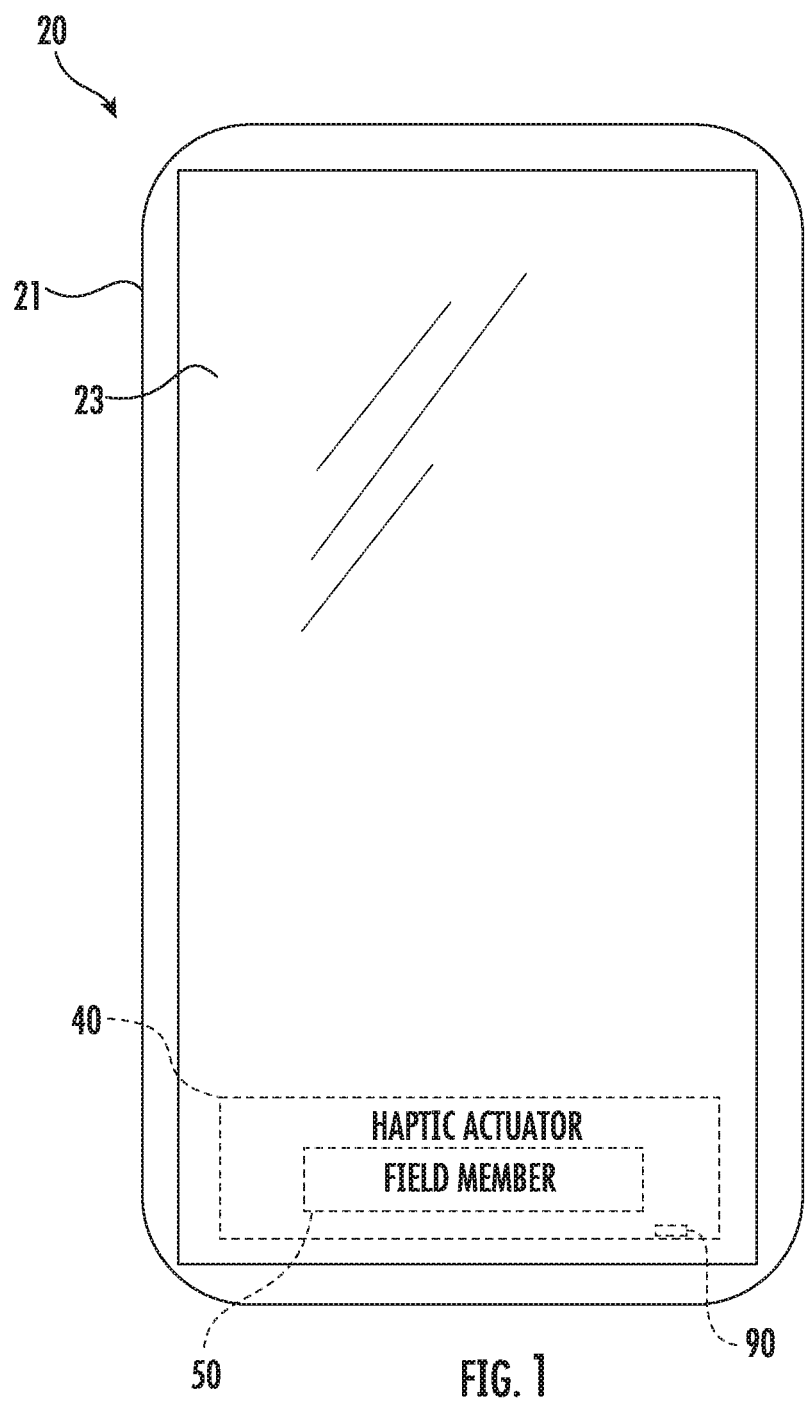
FIG. 1 is a schematic diagram of an electronic device in accordance with an embodiment.
Figure 2:
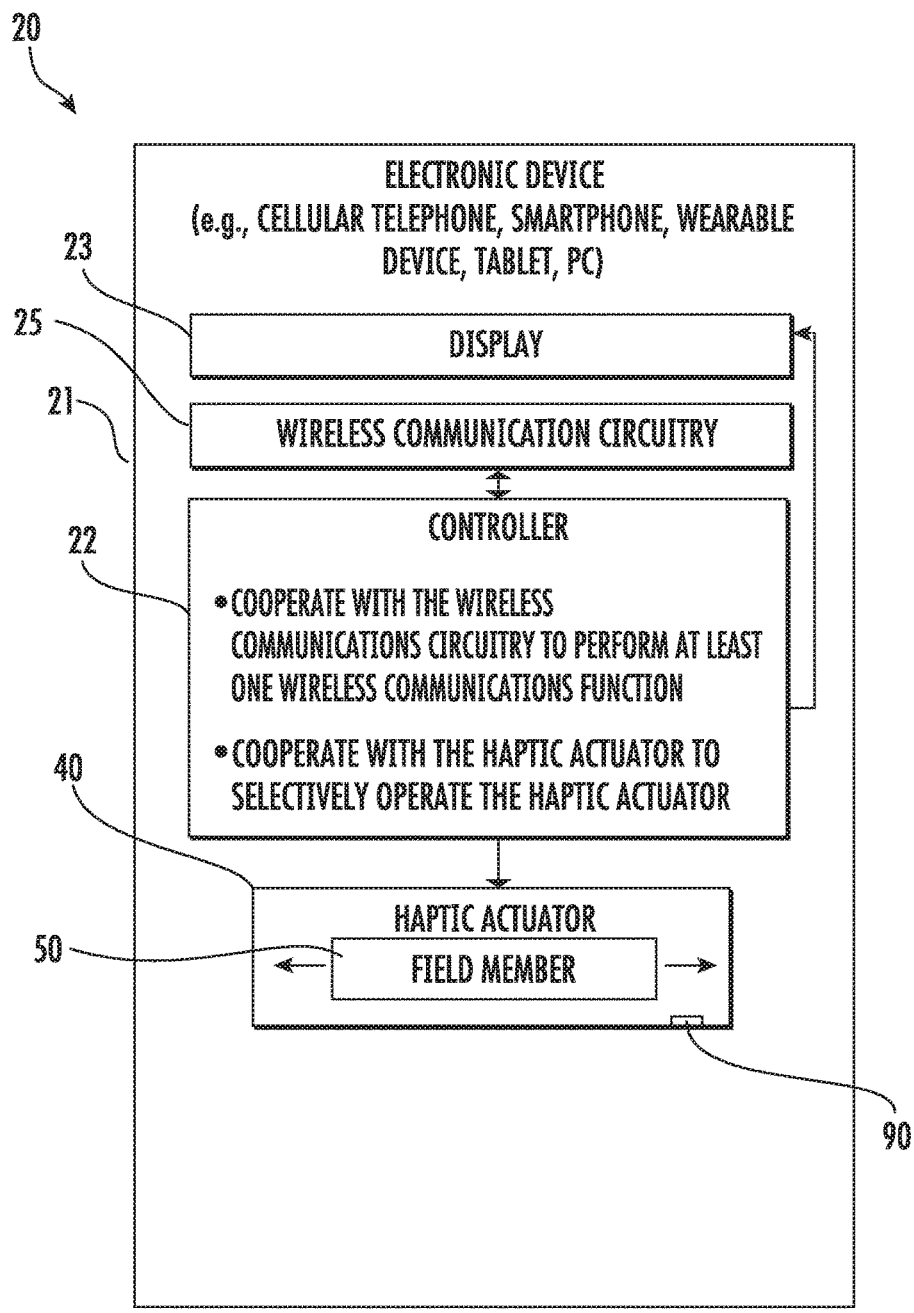
FIG. 2 is another schematic diagram of the electronic device of FIG. 1.
Figure 3:
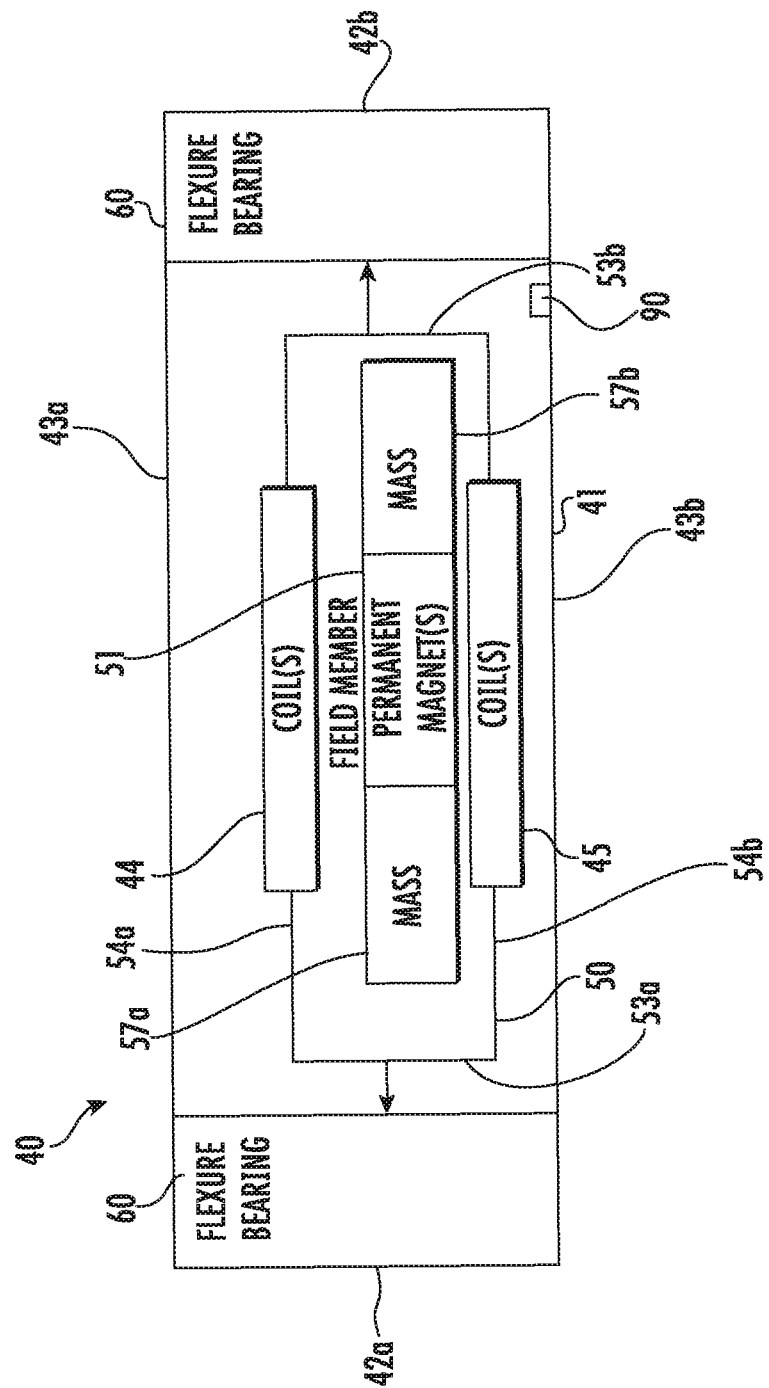
FIG. 3 is a schematic diagram of a portion of the haptic actuator of FIG. 2.

Referring initially to FIGS. 1-3, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Figure 4:
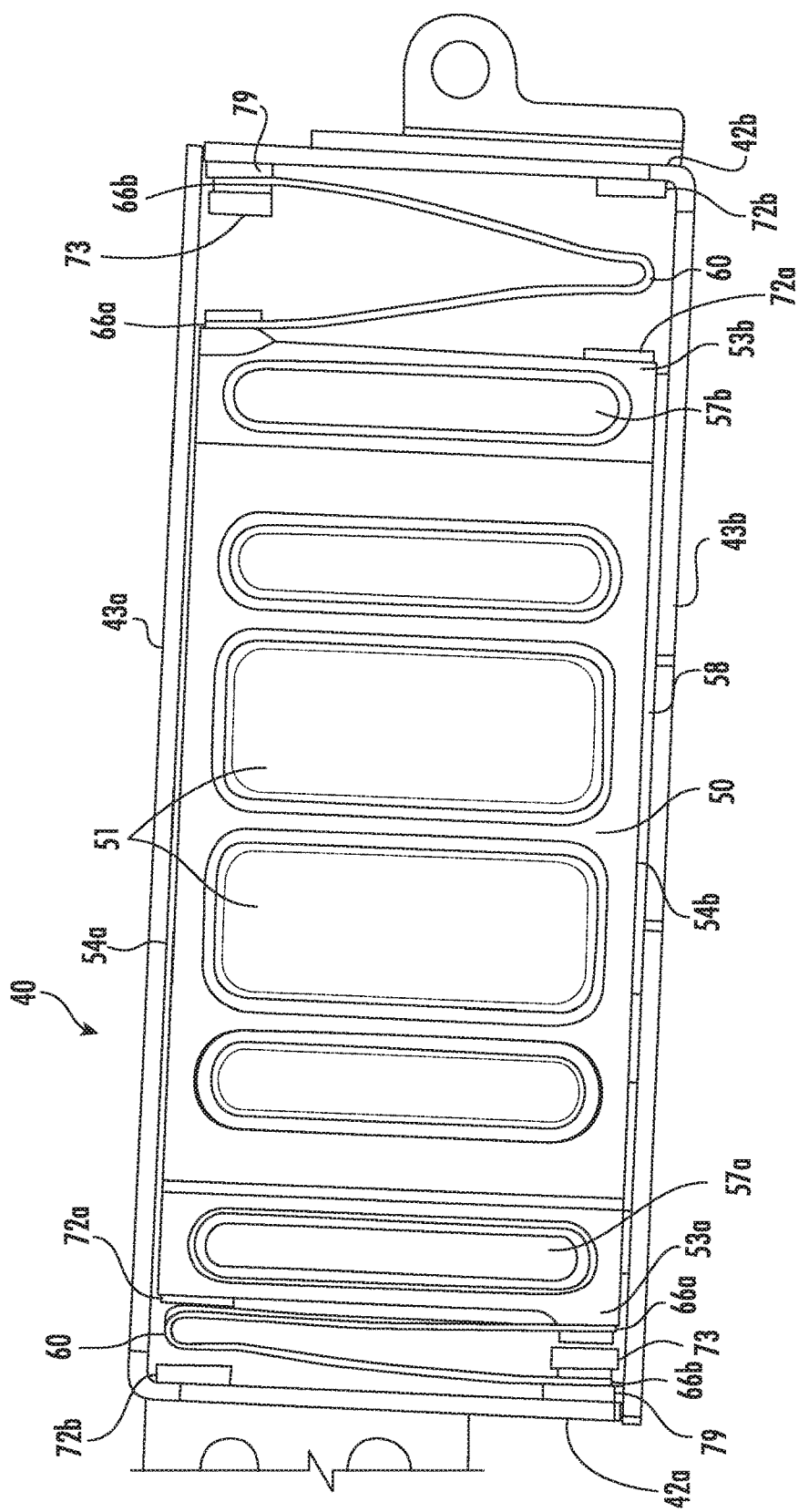
FIG. 4 is a schematic diagram of a prior art portion of the haptic actuator of FIG. 2.
Figure 5:
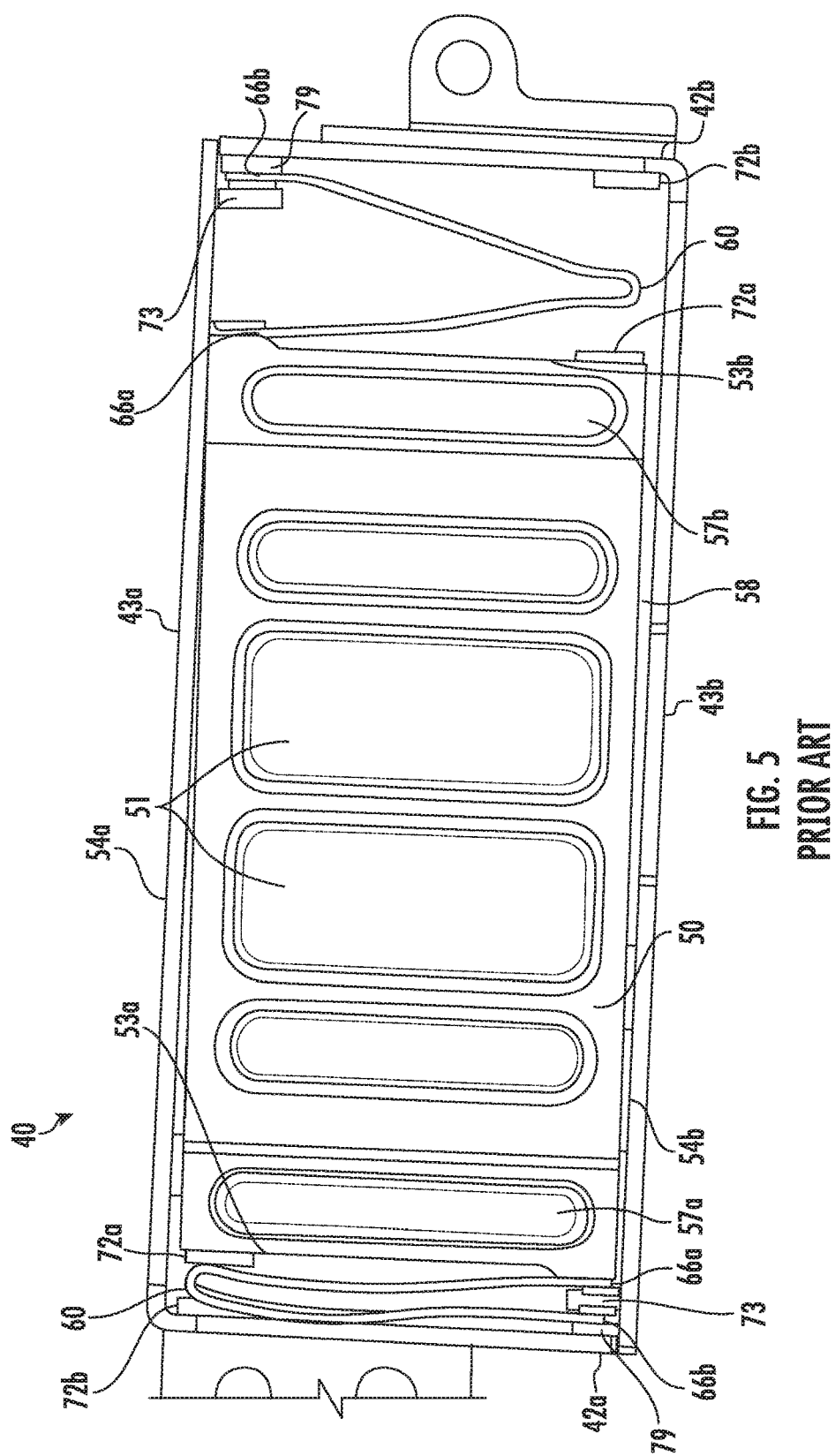
FIG. 5 is a schematic diagram of the prior art haptic actuator of FIG. 4 illustrating rotating and shifting of the field member from mechanical stress.

Referring now additionally to FIGS. 4-5, the haptic actuator 40 includes an actuator housing 41 that may be metal, for example. The actuator housing 41 may be another type of material or include more than one type of material. The actuator housing 41 has opposing ends 42a, 42b and opposing sides 43a, 43b. The actuator housing 41 illustratively has a dimension in a length direction greater than a width direction (e.g., x-axis travel direction). The haptic actuator 40 also includes first and second coils 44, 45 carried by the actuator housing 41, for example, the top and the bottom, respectively. The first and second coils 44, 45 may each have a loop shape or "racetrack" shape and are aligned in a stacked relation and spaced apart. There may be any number of first and second coils 44, 45 as will be appreciated by those skilled in the art.

The haptic actuator 40 also includes a field member 50 carried by the actuator housing 41. The field member 50, similarly to the actuator housing 41, has opposing ends 53a, 53b and opposing sides 54a, 54b extending therebetween. The field member 50, similarly to the actuator housing 41, has a dimension in a length direction greater than a width direction. Thus, the field member 50 is reciprocally movable in the length direction (i.e., the x-axis direction). While the movement of the field member 50 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 includes permanent magnets 51 between the first and second coils 44, 45. The permanent magnets 51 may be neodymium, for example, and may be positioned in opposing directions with respect to their respective poles.

The permanent magnets 51 may also have a rounded rectangle shape and may be aligned along a length of the first and second coils 44, 45. There may be any number of permanent magnets 51 having any shape between the first and second coils 44, 45.

The field member 50 also includes masses 57a, 57b adjacent the permanent magnets 51. The masses 57a, 57b may be tungsten, for example. The masses 57a, 57b may be a different material (e.g., relatively heavy material) and there may be any number of masses. In some embodiments, the field member 50 or a portion thereof may be tungsten (or other heavy material) and/or define the masses (e.g., instead of discrete masses).

The haptic actuator 40 also includes respective flexures 60 coupling each of first and second ends 53a, 53b of the field member 50 to be reciprocally movable within the actuator housing 41 responsive to the first and second coils 44, 45 over an operating range. Each respective flexure 60 also couples the field member 50 so that during operation, the field member reciprocally moves within the actuator housing 41 over the operating range while maintaining a respective sidewall clearance 58 between each side 54a, 54b of the field member and an adjacent side 43a, 43b of the actuator housing.

Figure 6:
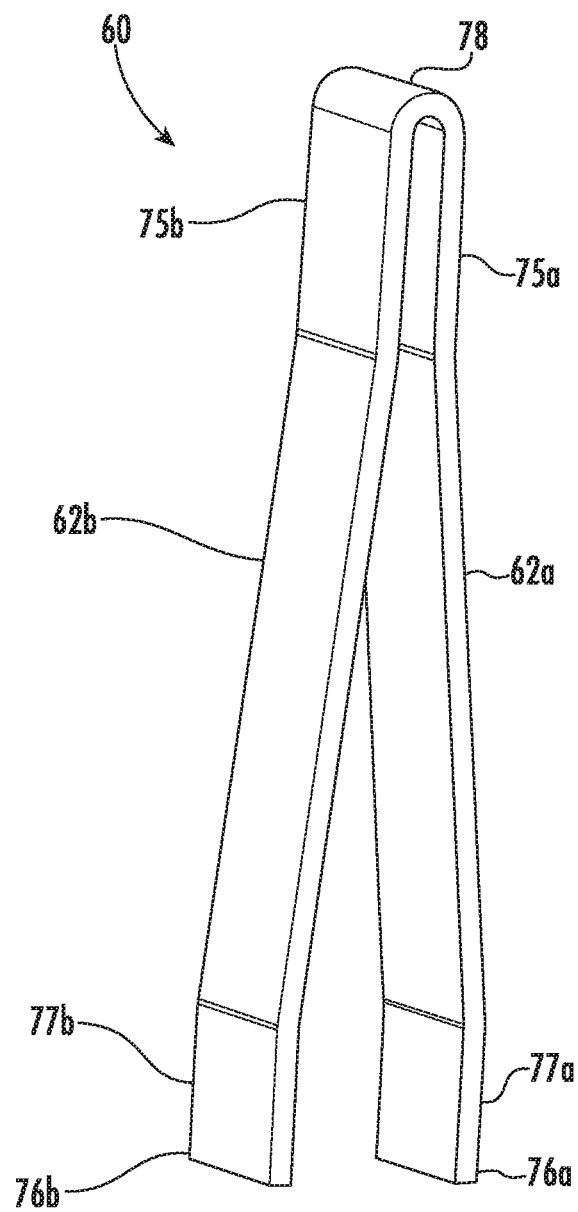
FIG. 6 is a schematic diagram of a flexure in accordance with the prior art.

Referring now additionally to FIG. 6, each flexure 60 illustratively has a wishbone or Y-shape, with two diverging arms 62a, 62b joined together at proximal ends 75a, 75b. The two diverging arms 62a, 62b have spaced distal ends 76a, 76b operatively coupled between adjacent portions of the field member 50 and the actuator housing 41.

A bend 78 joins together the two diverging arms 62a, 62b at the proximal ends 75a, 75b. The bend 78 causes the two diverging arms 62a, 62b to be spaced apart at the distal ends 76a, 76b. Illustratively, the two diverging arms 62a, 62b include a parallel portion 77a, 77b at the distal ends 76a, 76b. In some embodiments, the distal ends 76a, 76b of the two diverging arms 62a, 62b may continue to diverge instead of turning or becoming parallel. While an example flexure 60 is illustrated, each flexure may have a different shape and more than one flexure may be used to couple each end 53a, 53b of the filed member 50 to an adjacent end 42a, 42b of the actuator housing 41. For example, as will be appreciated by those skilled in the art, the haptic actuator 40, and more particularly, the geometry of each flexure 60 may satisfy desired stress and stiffness metrics relative to other flexure geometries, particularly under a relatively confined space under a specified amplitude of travel displacement for haptic applications.

Flexure bodies 66a, 66b are carried facing one another by the parallel portions 77a, 77b at or between the distal ends 76a, 76b (FIGS. 4-5). Mechanical stops 72a, 72b are adjacent the proximal ends 75a, 75b (FIGS. 4-5). More particularly, first and second mechanical stops 72a, 72b are between the proximal ends 75a, 75b and the adjacent sides 43a, 43b, 54a, 54b of the actuator housing 41 and the field member 50, respectively. The first and second mechanical stops 72a, 72b may be an elastomeric material, for example. A third mechanical stop 73 is carried by the distal end 76a of one of the diverging arms 62a, and more particularly, is between the distal ends 76a, 76b and carried by the flexure body 66b (FIGS. 4-5). The third mechanical stop 73 may be a material similar to the first and second mechanical stops 72a, 72b. The third mechanical stop 73 may be carried by the other diverging arm 62b.

A respective anchor member 79 is coupled between each flexure 60 and the adjacent end 42a, 42b of the actuator housing 41 (FIGS. 4-5). More particularly, the anchor member 79 is coupled between a distal end 76a of an arm 62a and the side 42a of the housing 41.

As will be appreciated by those skilled in the art, the haptic actuator 40 is designed to operate within a given operating range and within a given set of operating specifications, for example, range of motion, sound level, etc. However, when the haptic actuator 40 is subject to mechanical shock, for example, during a drop, each flexure 60 may become plastically deformed causing the haptic actuator to no longer satisfy desired characteristics. More particularly, the plastic deformation may cause a permanent offset of the field member 50. Permanent offset of the field member 50 may cause increased power draw for an idle mode, for example, by holding the zero position, and in an active mode, for example, by using more power to operate the haptic actuator 40. Additionally, a relatively large offset can lead to "phantom clicks" unless parking algorithms are used and enough latency is allowed. Repeated plastic deformation may also negatively impact flexure and module life time reliability.

More particularly, a flexure 60 is designed to deform in the x-axis direction (FIG. 4). Deformation y-axis and z-axis direction may lead to relatively large stresses. Gaps in the y-axis and z-axis directions may be reduced through actuator tolerances—without causing contact during operation. However, off-center contact (e.g., of the mechanical stop 72a, 72b) generally results in the field member 50 rotating and deforming flexures in the y-axis direction (FIG. 5). The resistance of a flexure to y-axis deformation may be higher in the closed-position leading to high stresses and plastic deformation (FIG. 5). Off-center stopping force results in the field member 50 rotating and shifting down in y-axis direction (FIG. 5).

Thus, it may be desirable to lower plastic deformation, and thus battery usage and module reliability, for example, after being subjected to mechanical shock. To address this, the field member-to-actuator housing gap (i.e., the sidewall clearance) for the x-axis direction of travel is closed beyond operational travel range. In this way, stresses may be reduced or limited during a drop or mechanical shock and while not causing unwanted contact during normal operation.

Figure 7:
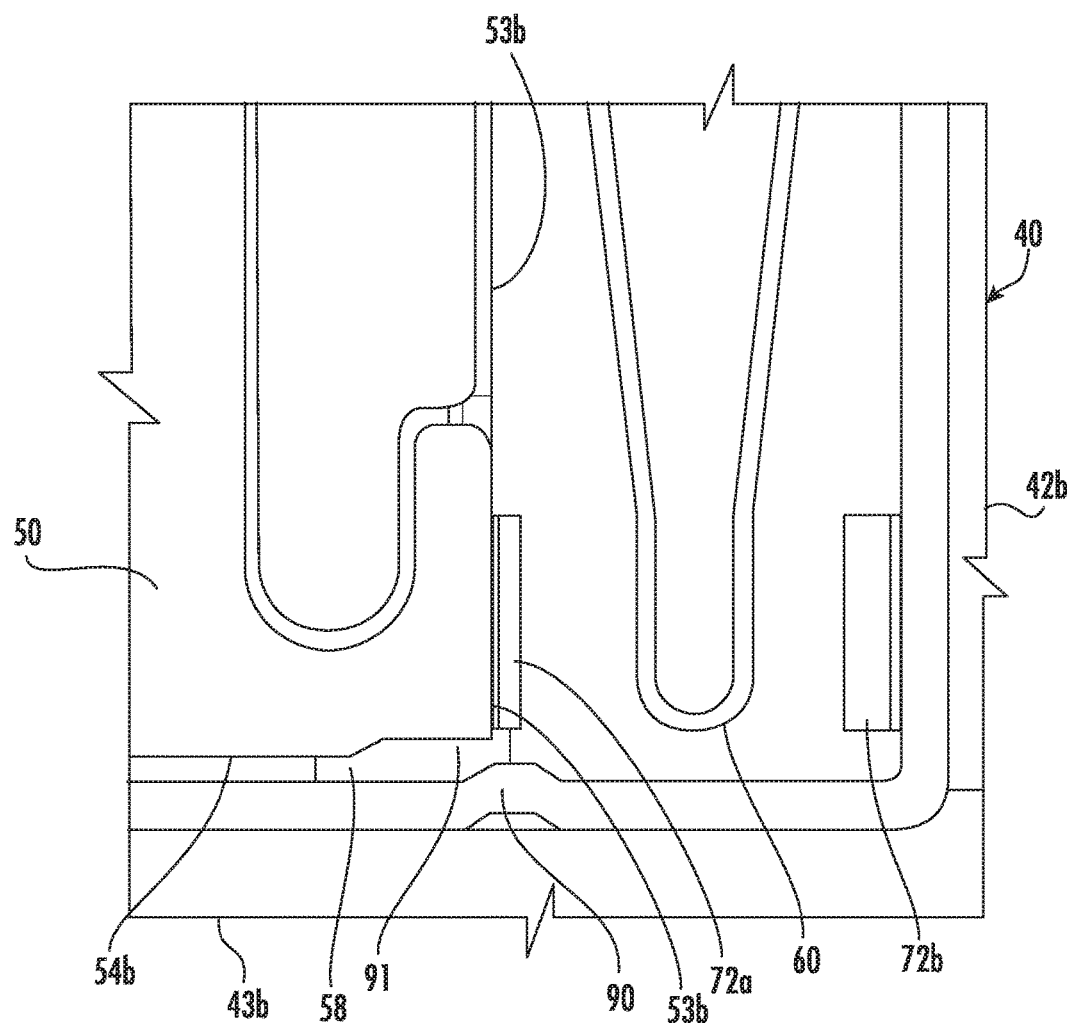
FIG. 7 is a more detailed schematic diagram of a portion of the haptic actuator of FIG. 2.

Referring additionally to FIG. 7, the haptic actuator 40 includes a sidewall clearance restricting feature in the form of a protruding body 90 carried by a side 43b of the actuator housing 41 and extending within the respective sidewall clearance 58. The protruding body 90 restricts the sidewall clearance 58 when the field member 50 moves beyond the operating range when subject to mechanical shock. Mechanical shock may include drops, impacts, and relatively high accelerations (e.g., beyond a threshold) with or without impact. There may be more than one protruding body 90 along the same side 43b of the actuator housing 41 and/or there may one or more protruding bodies carried by another side 43a of the actuator housing. Where the actuator housing 41, and more particularly, the side 43b includes metal, the protruding body 90 may be in the form of a stamped metal protruding body. The protruding body 90 may be the same material as the actuator housing 41 or may be another material, for example, epoxy.

The field member 50 also illustratively includes a recess 91 therein adjacent the protruding body 90. The recess 91 cooperates with the protruding body 90 to permit the protruding body 90 to be positioned closer to the field member 50 and away from the bend 78 of the flexure 60. The protruding body 90 may be integrally formed with the actuator housing 41 or formed separately and coupled to the actuator housing. The recess 91 may span the full height of the field member 50 (i.e., a complete cutaway of a portion of the field member). The recess 91 may also be less than the height of the field member 50, for example, and sized to be larger than the height of the protruding body 90 carried by the actuator housing 41 (such as, for example, a slot within the field member sized to include any tolerances in the size and position of the protruding body).

The protruding body 90 and the recess 91 reduce the y-axis gap or sidewall clearance beyond operational travel resulting in a variable gap or sidewall clearance 58. A simulated drop or mechanical shock for a haptic actuator 40 with the protruding body 90 predicts 68 μm of permanent offset as opposed to 150 μm without the protruding body.

Figure 8:
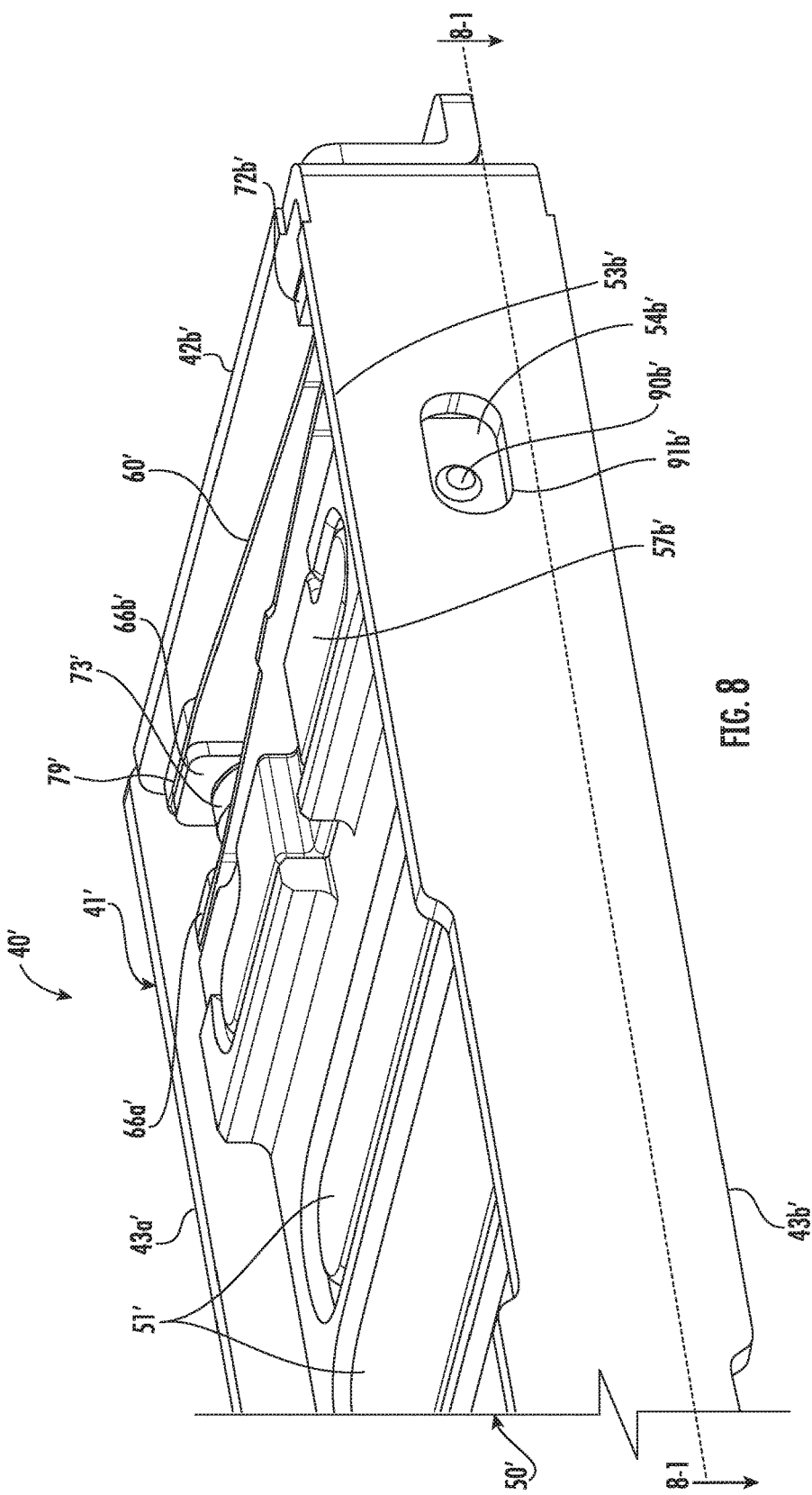
FIG. 8 is a schematic diagram of a portion of a haptic actuator in accordance with another embodiment.
Figure 9:
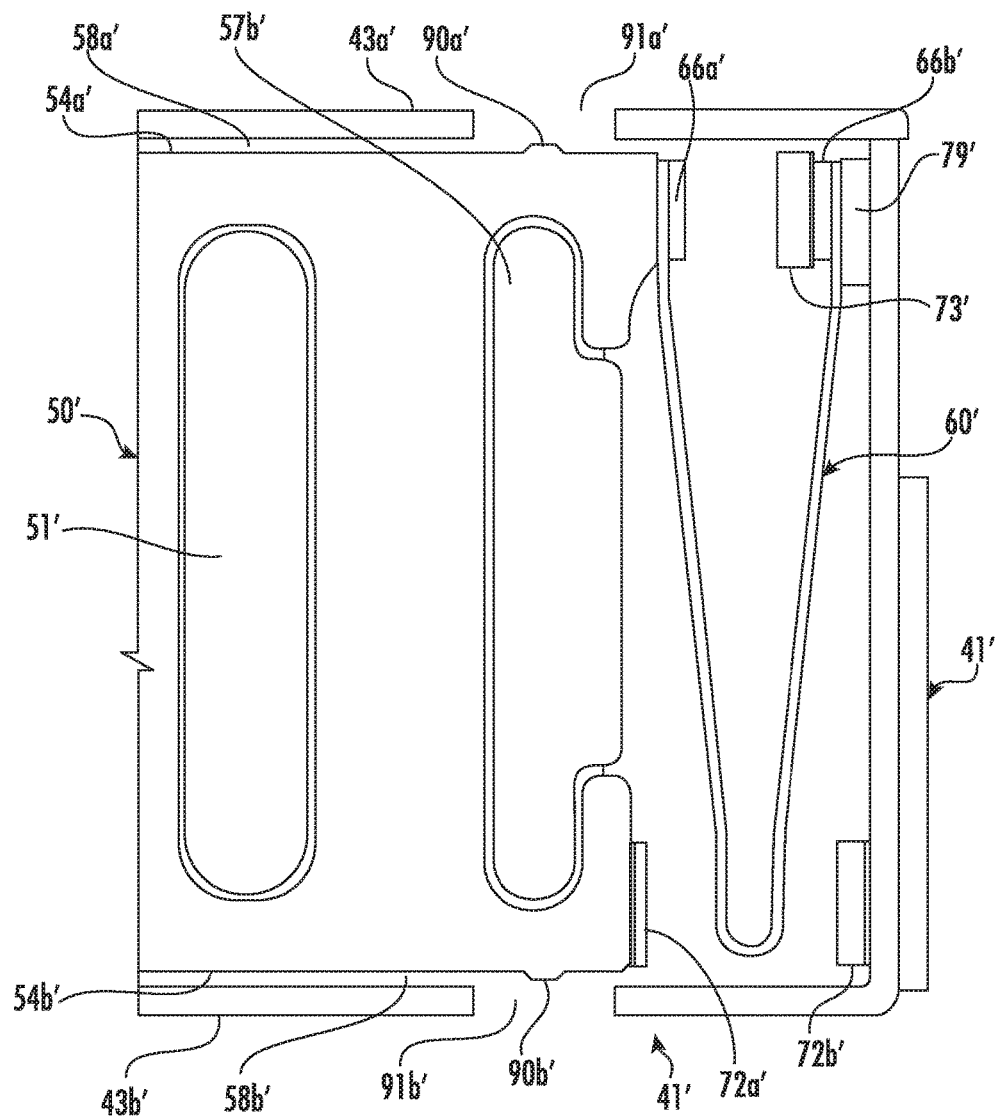
FIG. 9 is a schematic cross-sectional view of a portion of the haptic actuator of FIG. 8 taken along line 8-1.

Referring now to FIGS. 8-9, in another embodiment, protruding bodies 90a', 90b' may be carried by the respective sides 54a', 54b', of the field member 50'. Corresponding recesses 91a', 91b' are illustratively formed in the corresponding sides 43a', 43b' of the actuator housing 41'. Similar to the embodiments, described above, the field member 50' is reciprocally movable within the actuator housing 41' over an operating range and while maintaining a respective sidewall clearance 58a', 58b' between each side 54a', 54b' of the field member and an adjacent side 43a', 43b' of the actuator housing. The protruding bodies 90a', 90b' restrict the sidewall clearance 58a', 58b' when the field member 50' moves beyond the operating range when subject to mechanical shock. While two protruding bodies 90a', 90b' and corresponding recesses 91a', 91b' are illustrated, it should be appreciated by those skilled in the art that there may be more than two protruding bodies and recesses or a single protruding body and recess. Elements illustrated but not specifically described herein with respect to the present embodiment are similar to those described above and need no further description herein.

In any of the embodiments described herein, more than one protruding body 90 may be used along either or both the same side or different sides of the actuator housing 41. For example, there may be a protruding body 90 (and corresponding recess 91) on each adjacent corner or two on each side 43a, 43b of actuator housing 41 adjacent respective opposing ends 42a, 42b. Moreover, a protruding body 90 and recess 91 may be similarly used to restrict the clearance in the z-axis direction.

A method aspect is directed to a method of making a haptic actuator 40 that includes an actuator housing 41 having opposing ends 42a, 42b and opposing sides 43a, 43b extending therebetween, at least one coil 44, 45 carried by the actuator housing, and a field member 50 having opposing ends 53a, 53b and opposing sides 54a, 54b extending therebetween. The method includes positioning a respective flexure 60 coupling each end 53a, 53b of the field member 50 and an adjacent end 42a, 42b of the actuator housing 41 so that the field member 50 is reciprocally movable within the actuator housing responsive to the at least one coil 44, 45 over an operating range and while maintaining a respective sidewall clearance 58 between each side of the field member and an adjacent side of the actuator housing. The method also includes forming at least one sidewall clearance restricting feature 90 to restrict the sidewall clearance 58 when the field member 50 moves beyond the operating range when subject to mechanical shock.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
   a housing having opposing ends and opposing sides extending therebetween;
   at least one coil carried by the housing;
   a field member having opposing ends and opposing sides extending therebetween;
   a respective flexure coupling each end of the field member to an adjacent end of the housing so that the field member is reciprocally movable within the housing responsive to the at least one coil over an operating range and while maintaining a respective sidewall clearance between each side of the field member and an adjacent side of the housing; and
   at least one sidewall clearance restricting feature configured to restrict the sidewall clearance when the field member moves beyond the operating range when subject to mechanical shock.

2. The haptic actuator of claim 1 wherein the at least one sidewall clearance restricting feature comprises at least one protruding body carried by the housing and extending within the respective sidewall clearance.

3. The haptic actuator of claim 2 wherein the field member has a recess therein adjacent the at least one protruding body.

4. The haptic actuator of claim 2 wherein the housing comprises metal; and wherein the at least one protruding body comprises an at least one stamped metal protruding body.

5. The haptic actuator of claim 1 wherein the at least one sidewall clearance restricting feature comprises at least one protruding body carried by the field member and extending within the respective sidewall clearance.

6. The haptic actuator of claim 5 wherein the housing has a recess therein adjacent the at least one protruding body.

7. The haptic actuator of claim 1 wherein each respective flexure has a wishbone shape and comprises two diverging arms joined together at proximal ends and having spaced distal ends operatively coupled between adjacent ends of the field member and the housing.

8. The haptic actuator of claim 7 wherein each respective flexure has a bend therein joining together the two diverging arms at the proximal ends.

9. The haptic actuator of claim 1 further comprising a respective at least one anchor member coupled to an adjacent end of the housing and spaced apart from an adjacent end of the field member.

10. The haptic actuator of claim 9 wherein each respective flexure is coupled between the respective at least one anchor member and the field member.

11. The haptic actuator of claim 1 wherein the field member comprises at least one permanent magnet adjacent the at least one coil.

12. An electronic device comprising:
    a housing;
    wireless communications circuitry carried by the housing;
    a haptic actuator carried by the housing and comprising
       an actuator housing having opposing ends and opposing sides extending therebetween;
       at least one coil carried by the actuator housing;
       a field member having opposing ends and opposing sides extending therebetween,
       a respective flexure coupling each end of the field member to an adjacent end of the actuator housing so that the field member is reciprocally movable within the actuator housing responsive to the at least one coil over an operating range and while maintaining a respective sidewall clearance between each side of the field member and an adjacent side of the housing, and
       at least one sidewall clearance restricting feature configured to restrict the sidewall clearance when the field member moves beyond the operating range when subject to mechanical shock; and
    a controller coupled to the wireless communications circuitry and the haptic actuator and configured to perform at least one wireless communications function and selectively operate the haptic actuator, respectively.

13. The electronic device of claim 12 wherein the at least one sidewall clearance restricting feature comprises at least one protruding body carried by the actuator housing and extending within the respective sidewall clearance.

14. The electronic device of claim 13 wherein the field member has a recess therein adjacent the at least one protruding body.

15. The electronic device of claim 13 wherein the actuator housing comprises metal; and wherein the at least one protruding body comprises an at least one stamped metal protruding body.

16. The electronic device of claim 12 wherein the at least one sidewall clearance restricting feature comprises at least one protruding body carried by the field member and extending within the respective sidewall clearance.

17. The electronic device of claim 16 wherein the actuator housing has a recess therein adjacent the at least one protruding body.

18. A method of making a haptic actuator comprising a housing having opposing ends and opposing sides extending therebetween, at least one coil carried by the housing, and a field member having opposing ends and opposing sides extending therebetween, the method comprising:
    positioning a respective flexure coupling each end of the field member and an adjacent end of the housing so that the field member is reciprocally movable within the housing responsive to the at least one coil over an operating range and while maintaining a respective sidewall clearance between each side of the field member and an adjacent side of the housing; and
    forming at least one sidewall clearance restricting feature to restrict the sidewall clearance when the field member moves beyond the operating range when subject to mechanical shock.

19. The method of claim 18 wherein forming the at least one sidewall clearance restricting feature comprises forming at least one protruding body carried by the housing and extending within the respective sidewall clearance.

20. The method of claim 19 further comprising forming a recess in the field member adjacent the at least one protruding body.

21. The method of claim 19 wherein the housing comprises metal; and wherein forming the at least one protruding body comprises forming at least one stamped metal protruding body.

22. The method of claim 18 wherein forming the at least one sidewall clearance restricting feature comprises forming at least one protruding body carried by the field member and extending within the respective sidewall clearance.

23. The method of claim 22 further comprising forming a recess in the housing adjacent the at least one protruding body.

* * * * *